Jan. 4, 1949.   T. B. SPARKS   2,458,215
TOMATO CORER
Filed Dec. 7, 1944
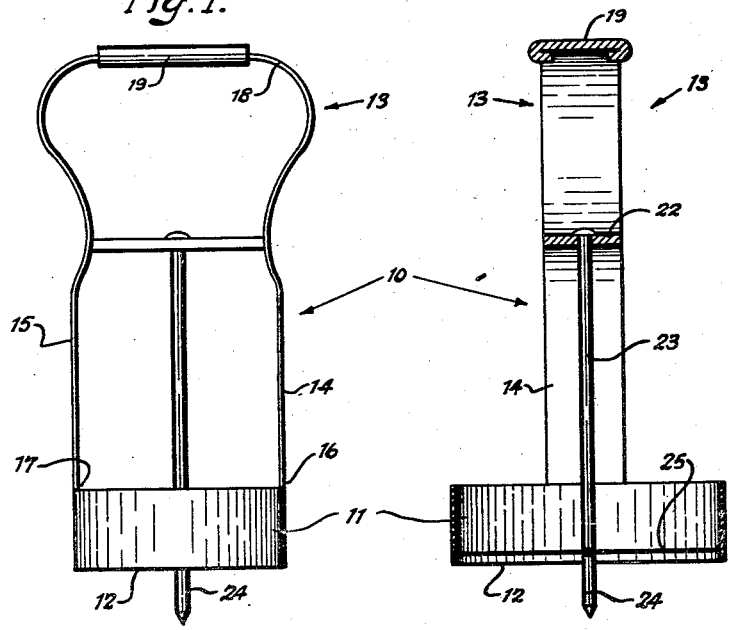
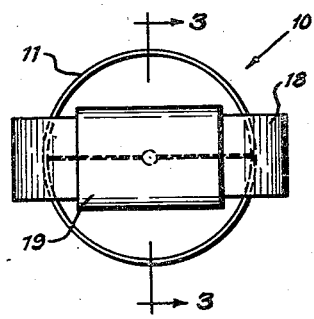
Inventor
Tomme B. Sparks.
By Clarence A. O'Brien
and Harvey B. Jacobson
Attorneys Patented Jan. 4, 1949

2,458,215

UNITED STATES PATENT OFFICE 2,458,215

TOMATO CORER

Tomme B. Sparks, Denver, Colo.

Application December 7, 1944, Serial No. 566,972

8 Claims. (Cl. 30—302)

This invention relates to culinary articles and has for its object to provide a device whereby the core of a tomato may be quickly and neatly removed.

Another object of the invention is to provide a device by means of which a tomato, pepper or other vegetable may be quickly and neatly hollowed out in order to "stuff" the same for baking.

A further object of the invention is to provide a device for cutting a cylindrical chamber within a vegetable and severing the cut-out portion from the bottom without cutting entirely through the vegetable.

A still further object of my invention is to provide a corer having means for limiting its passage through the article being cured.

Other features and advantages will become more readily apparent from the following description and the accompanying illustrative drawings in which:

Figure 1 is an elevational view of my corer,

Figure 2 is a top plan view thereof, and

Figure 3 is a sectional view taken on line 3—3 of Figure 2.

In the accompanying drawings, as above enumerated and in the following specification, a corer 10 for tomatoes or other vegetable, which consists of a cylinder ring, circular blade or cutter member 11 provided with a bottom annular knife edge 12. To the cylinder is attached a handle 13, formed of a rigid metal strap bent to a U-shape and inverted to provide vertical parallel arms 14 and 15, the lower ends 16 and 17 of which form the attaching means to secure the same at diametrically opposite points to the cylinder 11, preferably at its upper edge, and the upper cross head or bight portion 18 of which has a wider central portion with the opposite edges turned under and forms the handhold 19.

Connecting the curved-in portions 20 and 21 of the arms 14 and 15 of member 13 is a cross bar or brace 22, through which and to which is fixed the upper end of an elongated pin 23, which projects vertically down through the center of cylinder blade or cutter member 11, the pointed lower end 24 of which pin extends far enough below said annular cutting edge 12 to form in connection with brace 22 a stop and preventing cutting through the bottom wall of a vegetable being cored out. Extending transversely across the cutter member 11, preferably at right angles to the handle 13, and secured to the pin 23, is a fine wire 25, which is located just above said knife edge 12 to hold or form a centering device for the pin 23 and when turned after the cutting edge 12 is pressed down to sever the core above the bottom wall of the vegetable.

In using the above described corer, the point 24 of pin 23 is projected into the vegetable and the device is given a slight twist to cause the edge 12 to cut through the upper skin, then the device is pressed down to cause edge 12 to cut a circular core down to the bottom wall of the vegetable until the point 24 contacts the table, board or other article supporting the vegetable when the core cut and divided vertically and diametrically by the wire 25 will be in two halves to be used as stuffing, eaten or saved for juice or other purposes, then the corer is again given a one-half turn, upon which the wire 25 will cut the otherwise severed core loose at its bottom above the bottom wall and skin of the vegetable, permitting the severed core to be removed by pulling out the corer from the vegetable to leave the bottom wall and skin intact except for the pin hole made by the point 24 of pin 23 which will tend to close.

It is thought that persons skilled in the art to which the invention relates will be able to obtain a clear understanding of the invention after considering the description in connection with the drawings. Therefore, a more lengthy description is regarded as unnecessary.

Minor changes in shape, size and rearrangement of details and parts, such as come within the purview of the invention claimed, may be resorted to, in actual practice, if desired.

Having now described my invention that which I claim as new and desire to procure by Letters Patent is:

1. A device as described comprising a cylindrical cutter, means for limiting the down movement thereof through a vegetable, a handle to which the cylinder is attached, a support for said means carried by said handle, a transverse cutter carried by said cylinder, consisting of a fine wire, said means, which consists of a pin centrally of the cylindrical cutter serving also as a centering device for said cutter.

2. A device as described comprising a cylindrical cutter, means for limiting the down movement thereof through a vegetable, a handle to which the cylinder is attached, a support for said means carried by said handle, a transverse cutter carried by said cylinder, consisting of a fine wire, said means also serving as a centering device for said cutter.

3. A device as described comprising a cylindrical cutter, means depending below the cutter for limiting the down movement thereof through a vegetable, a handle to which the cylinder is attached, a support for said means carried by said handle, and a transverse cutter carried by said cylinder, consisting of a fine wire.

4. A corer of the class described comprising a cylindrical cutter, a U-shaped handle in inverted position to the extremities of which the cylinder is attached, a combined centering and stop device carried by the handle and extending vertically downward centrally of the handle and cutter and below the latter, and a transverse cutter and stop device support comprising a fine member having its ends anchored at diametrically opposite points to the cylindrical cutter near its bottom edge and centrally to said device.

5. A corer as described comprising a cylindrical cutter blade having a bottom cutting edge, a handle attached to the top edge of the cutter blade and extending upwardly therefrom in straddling position, a pin mounted at its upper end vertically and centrally of the cutter blade and handle below the top of the latter and extending below the cutting edge for limiting the down movement thereof through a vegetable by engagement with a surface on which the vegetable rests, and a cutter comprising a fine strand extending diametrically of the cutter blade and anchored centrally of its length to the pin.

6. A corer of the class described comprising an inverted U-shaped handle, a circular cutter blade having a bottom cutting edge and anchored at its top edge to the extremities of the handle, a cross member between the sides of the handle spaced from the top thereof, a pin anchored at its upper end centrally to the cross member and extending centrally down through the cutter blade and below the bottom cutting edge thereof, and a wire connected at diametrically opposite points to the cutter blade near its bottom edge and centrally to the pin.

7. A corer of the class described comprising an inverted U-shaped handle, a circular cutter blade having a bottom cutting edge and anchored at its top edge to the extremities of the handle, a cross member between the sides of the handle spaced from the top thereof, a pin anchored at its upper end centrally to the cross member and extending centrally down through the cutter blade and below the bottom cutting edge thereof, and a wire connected at diametrically opposite points to the cutter blade near its bottom edge and centrally to the pin and extending at right angles to the sides of the handle.

8. A device as described comprising a circular cutting blade disposed vertically on edge and having a cutting edge at the bottom, an inverted U-shaped handle to which the cutter blade is attached, a cross support carried by the handle below its upper bight portion, a pin mounted at its upper end vertically and centrally of the support and extending downwardly and through and below the cutter blade, and a horizontal wire cutter extending transversely of the cutter blade near its bottom edge and secured to the pin.

TOMME B. SPARKS.

REFERENCES CITED

The following references are of record in the file of this patent:

UNITED STATES PATENTS

| Number | Name | Date |
|---|---|---|
| 726,707 | Lavender | Apr. 28, 1903 |
| 1,293,351 | Creasey | Feb. 4, 1919 |
| 1,568,008 | Thomas | Dec. 29, 1925 |
| 2,150,046 | Bard | Mar. 7, 1939 |
| 2,246,424 | Turner | June 17, 1941 |

FOREIGN PATENTS

| Number | Country | Date |
|---|---|---|
| 788,641 | France | July 29, 1935 |